US012798539B2

(12) United States Patent
Jeong

(10) Patent No.: US 12,798,539 B2
(45) Date of Patent: Nov. 17, 2026

(54) VEHICULAR BRAKING APPARATUS

(71) Applicant: HYUNDAI MOBIS CO., LTD., Seoul (KR)

(72) Inventor: Seung Hwan Jeong, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 395 days.

(21) Appl. No.: 18/489,490

(22) Filed: Oct. 18, 2023

(65) Prior Publication Data

US 2025/0033620 A1 Jan. 30, 2025

(30) Foreign Application Priority Data

Jul. 24, 2023 (KR) ........................ 10-2023-0096229

(51) Int. Cl.

*B60T 13/68* (2006.01)
*B60T 13/18* (2006.01)
*B60T 17/00* (2006.01)
*F16K 31/06* (2006.01)

(52) U.S. Cl.

CPC ............ *B60T 13/686* (2013.01); *B60T 13/18* (2013.01); *B60T 17/00* (2013.01)

(58) Field of Classification Search

CPC ........ B60T 13/686; B60T 13/18; B60T 17/00; B60T 15/028; F16K 31/0637

See application file for complete search history.

(56) References Cited

U.S. PATENT DOCUMENTS 6,254,199 B1 * 7/2001 Megerle .................. B60T 8/363 137/550
6,364,430 B1 * 4/2002 Park ........................ B60T 8/363 303/119.2
6,439,265 B1 * 8/2002 Gruschwitz ............. B60T 8/363 251/129.02
7,134,640 B2 * 11/2006 Koeder ................... B60T 8/363 335/299
7,467,780 B2 * 12/2008 Kratzer ............... F16K 31/0655 335/304
7,717,399 B2 * 5/2010 Park ........................ B60T 8/368 303/119.2
8,474,787 B2 * 7/2013 Fink ........................ B60T 8/363 137/550
9,457,784 B2 * 10/2016 Tokoi .................... B60T 11/103

(Continued)

*Primary Examiner* — Thomas W Irvin
(74) *Attorney, Agent, or Firm* — NovoTechIP International PLLC

(57) ABSTRACT

The present disclosure relates to a vehicular braking apparatus, the vehicular braking apparatus including a pump housing having an inlet and an outlet through which a fluid flows, a valve body inserted into and fixed to the pump housing, a plunger accommodated in the valve body and movable by an armature, a seat installed inside the valve body and having a passage hole through which the fluid passes, the seat being configured to block a flow of the fluid by contact with the plunger, a flow path formed between the seat and the valve body for a flow of the fluid therethrough, an elastic part interposed between the seat and the plunger to elastically support the plunger, and a sealing part pressed into the pump housing and the seat and configured to form a passage through which the fluid flows, the valve body being seated on the sealing part.

4 Claims, 4 Drawing Sheets

(56) References Cited

U.S. PATENT DOCUMENTS

| | | | | |
|---|---|---|---|---|
| 9,623,854 | B2 * | 4/2017 | Jeon | F16K 31/0665 |
| 10,480,673 | B2 * | 11/2019 | Yoon | F16K 31/0665 |
| 10,737,676 | B2 * | 8/2020 | Lee | F16K 31/0634 |
| 11,724,681 | B2 * | 8/2023 | Jeong | F16K 31/0624 303/6.01 |
| 11,760,328 | B2 * | 9/2023 | Kam | B60T 13/686 251/129.15 |
| 11,959,554 | B2 * | 4/2024 | Jeong | F16K 31/0631 |
| 12,275,386 | B2 * | 4/2025 | Jeong | B60T 8/4081 |
| 2010/0059698 | A1 * | 3/2010 | Guggenmos | B60T 8/363 251/129.15 |
| 2010/0308245 | A1 * | 12/2010 | Fink | F16K 31/0655 251/129.15 |
| 2015/0274144 | A1 * | 10/2015 | Tokoi | B60T 11/28 303/3 |
| 2020/0055509 | A1 * | 2/2020 | Stahr | H01F 7/127 |
| 2022/0212649 | A1 * | 7/2022 | Jeong | F16K 31/0637 |
| 2022/0348179 | A1 * | 11/2022 | Jeong | B60T 15/028 |
| 2023/0028195 | A1 * | 1/2023 | Kam | F16K 31/0696 |
| 2023/0110078 | A1 * | 4/2023 | Jeong | F16K 31/0637 137/625.48 |
| 2023/0131725 | A1 * | 4/2023 | Jeong | B60T 13/686 303/114.1 |
| 2023/0141694 | A1 * | 5/2023 | Ahn | B60T 13/662 303/6.01 |
| 2025/0196830 | A1 * | 6/2025 | Ganzel | B60T 8/1755 |

* cited by examiner

VEHICULAR BRAKING APPARATUS

CROSS-REFERENCE TO RELATED APPLICATIONS

This application claims the benefit of priority under 35 USC § 119 (a) to Korean Patent Applications No. 10-2023-0096229, filed on Jul. 24, 2023, the entire disclosure of which is incorporated herein by reference for all purposes.

TECHNICAL FIELD

Exemplary embodiments of the present disclosure relate to a vehicular braking apparatus, and more particularly, to a vehicular braking apparatus capable of controlling a pressure of fluid acting on a wheel of a vehicle.

BACKGROUND

In general, an anti-lock brake system (ABS) for vehicles detects the slip of a wheel and controls a braking pressure applied to the wheel, thereby preventing the wheel from locking during braking. This ensures that the wheel does not slip and maintains its direction during braking for safe braking.

The ABS is used in combination as a component of an electronic stability control (ESC). The ESC is a control device that allows a driver to maintain a lane without losing an ability to steer a vehicle when suddenly operating a steering wheel or driving on a curved road.

An electronic brake system for vehicles includes a plurality of solenoid valves configured to open and close a passage of a brake hydraulic line to control a braking pressure. Examples of the solenoid valves include a normally open solenoid valve that normally remains open and a normally closed solenoid valve that normally remains closed.

SUMMARY

Various embodiments are directed to a vehicular braking apparatus capable of blocking a pressure of fluid acting in both directions of a master cylinder and a wheel cylinder.

In an embodiment, there is provided a vehicular braking apparatus that includes a pump housing having an inlet and an outlet through which a fluid flows, a valve body inserted into and fixed to the pump housing, a plunger accommodated in the valve body and movable by an armature, a seat installed inside the valve body and having a passage hole through which the fluid passes, the seat being configured to block the flow of the fluid by contact with the plunger, a flow path formed between the seat and the valve body for the flow of the fluid therethrough, an elastic part interposed between the seat and the plunger to elastically support the plunger, and a scaling part pressed into the pump housing and the seat and configured to form a passage through which the fluid flows, the valve body being seated on the sealing part.

The sealing part may include a first sealing member having a first communication passage provided therein to fluidly communicate with the outlet and a first port provided on its outer surface to fluidly communicate with the passage hole, and a second sealing member provided on an outside of the first sealing member to surround the first sealing member, the second sealing member having a second communication passage provided therein to fluidly communicate with the flow path.

The first sealing member may be pressed into the seat, the second sealing member may be pressed into the pump housing, and the valve body may be seated on the second sealing member.

An upper end of the first sealing member may extend further toward the plunger than an upper end of the second sealing member.

The second sealing member may include a first extension that extends from a lower end of the first sealing member in a radial direction of the first sealing member, and a second extension that extends from an outer end of the first extension in a longitudinal direction of the first sealing member, the second extension including one or more second ports in fluid communication with the inlet.

A plurality of second ports may be spaced apart from each other in a circumferential direction of the second extension.

The second port may include a through-hole that extends through an outer surface of the second extension.

The second port may include a stepped portion recessed from an upper edge of the second extension.

The vehicular braking apparatus may further include a first filter interposed between the inlet and the second sealing member to filter the fluid.

The vehicular braking apparatus may further include a second filter interposed between the outlet and the sealing part to filter the fluid.

As apparent from the above description, the present disclosure provides the sealing part that is pressed into the pump housing and the seat and is restrained by the valve body to fix the position of the sealing part, which can block the pressure of fluid acting in both directions of the inlet and the outlet during the operation of the plunger and can prevent the leakage of the fluid.

In addition, the present disclosure has the effect of reducing material costs by eliminating several machining methods through simplification of the shape of the sealing part.

DETAILED DESCRIPTION

Figure 1:
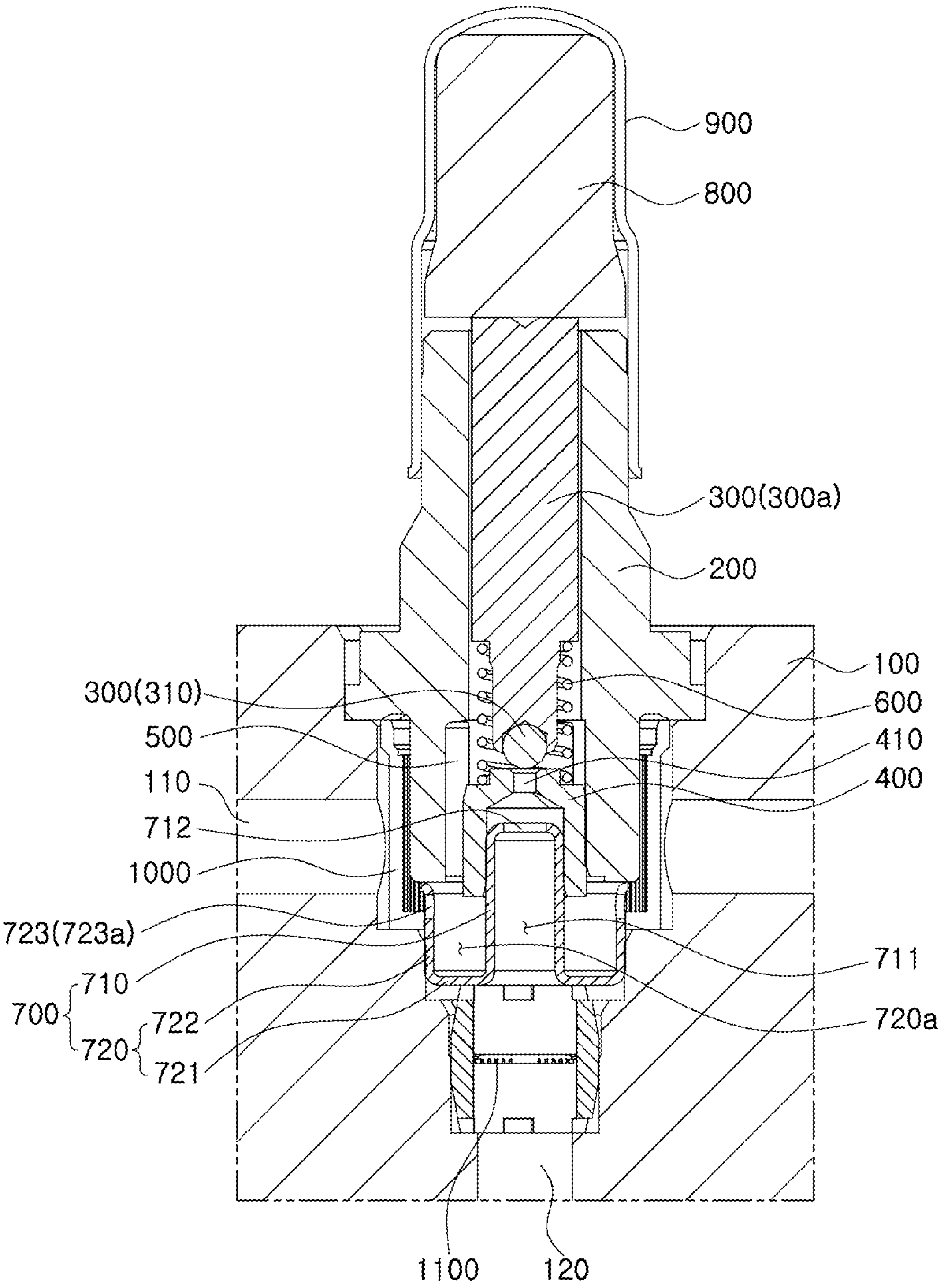
FIG. 1 is a cross-sectional view illustrating a vehicular braking apparatus according to a first embodiment of the present disclosure.

Hereinafter, a vehicular braking apparatus according to embodiments of the present disclosure will be described with reference to the accompanying drawings. It should be considered that the thickness of each line or the size of each component in the drawings may be exaggeratedly illustrated for clarity and convenience of description. In addition, the terms used herein are terms defined in consideration of functions of the present disclosure, and these terms may change depending on the intention or practice of a user or an operator. Therefore, these terms should be defined based on the entirety of the disclosure set forth herein.

Figure 2:
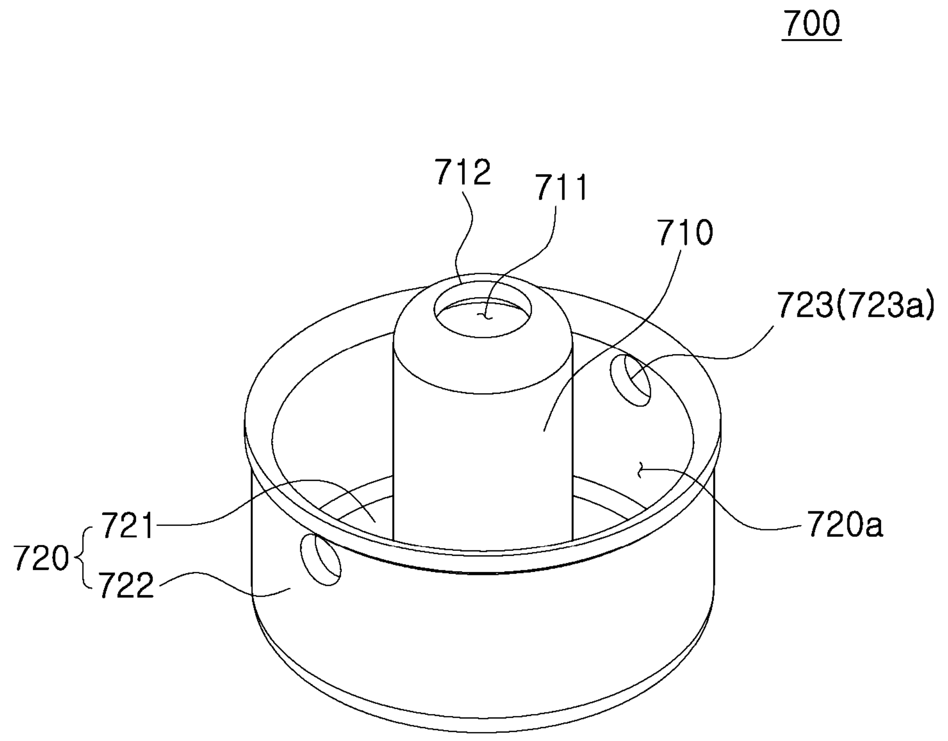
FIG. 2 is a perspective view illustrating a sealing part of the vehicular braking apparatus according to the first embodiment of the present disclosure.

FIG. 1 is a cross-sectional view illustrating a vehicular braking apparatus according to a first embodiment of the present disclosure. FIG. 2 is a perspective view illustrating a scaling part of the vehicular braking apparatus according to the first embodiment of the present disclosure.

Referring to FIGS. 1 and 2, the vehicular braking apparatus according to the first embodiment of the present disclosure includes a pump housing 100, a valve body 200, a plunger 300, a seat 400, a flow path 500, an elastic part 600, and a sealing part 700, which will be described in detail below.

The pump housing 100 includes an inlet 110 and an outlet 120 through which a fluid flows. In other words, the inlet 110 corresponding to a passage through which a fluid is introduced and the outlet 120 corresponding to a passage through which a fluid is discharged may be formed in the pump housing 100.

The pump housing 100 where the inlet 110 and the outlet 120 intersect may have accommodation grooves cut and machined to install the constituent parts of the vehicular braking apparatus according to the embodiment of the present disclosure. The inlet 110 may be connected to a master cylinder (not shown) and the outlet 120 may be connected to a wheel cylinder (not shown).

The passage leading from the inlet 110 to the outlet 120 is a passage through which a braking hydraulic pressure is transmitted via a pump to a wheel of a vehicle when there is a risk of unexpected rotation of the vehicle on an icy road or the like, that is, when an ESC function is activated.

The vehicular braking apparatus according to the embodiment of the present disclosure may include a normally open solenoid valve that closes a passage by electromagnetic force when a current is applied to the solenoid valve.

The valve body 200 is partially inserted into and fixed to the pump housing 100. In other words, the valve body 200 may be pressed, at one side (lower side in FIG. 1) thereof, into the pump housing 100 and coupled to the pump housing 100 by staking or the like.

The valve body 200 is illustrated as being perpendicular to and in axial communication with the pump housing 100 for convenience of explanation.

The plunger 300 is accommodated inside the valve body 200. The plunger 300 is operated by an armature 800 to reciprocate in the axial direction of the valve body 200. The plunger 300 may include plunger body 300*a* and ball member 310. A ball member 310 may be installed at one end (lower end in FIG. 1) of the plunger body 300*a*.

The vehicular braking apparatus may include a sleeve 900 configured to surround the armature 800 and extend toward the pump housing 100 to a set length to surround a portion of the valve body 200.

The plunger 300 reciprocates within the valve body 200 by the resultant force of the electromagnetic force generated by the armature 800, the elastic force of the elastic part 600, and the pressure of fluid flowing through the seat 400.

The electromagnetic force generated by the armature 800 acts on the plunger 300 in the downward direction in FIG. 1. The pressure of fluid introduced through the seat 400 acts on the plunger 300 in the upward direction in FIG. 1. The elastic force of the elastic part 600 acts on the plunger 300 in the upward direction in FIG. 1.

Among these forces acting on the plunger 300, the electromagnetic force generated by the armature 800 varies with the intensity of the current applied from the outside. Accordingly, the movement of the plunger 300 may be controlled by adjusting the intensity of the applied current.

The seat 400 is disposed inside the pump housing 100 and installed inside the valve body 200. In other words, the seat 400 may be mounted in a hollow on one side (lower side in FIG. 1) of the valve body 200.

The seat 400 is located on one side (lower side in FIG. 1) of the plunger 300. The seat 400 has a passage hole 410 through which a fluid passes. The passage hole 410 is formed through the outer surface (upper surface in FIG. 1) of the seat 400 directed the plunger 300.

The seat 400 selectively blocks the flow of fluid by contact with the plunger 300. The ball member 310 provided at the end of the plunger body 300*a* toward the seat 400 comes into contact with or releases contact with the passage hole 410 of the seat 400 while moving together with the plunger body 300*a* by the electromagnetic force of the armature 800, thereby opening or closing the passage hole 410. In other words, when the plunger body 300*a* moves toward the seat 400, the ball member 310 comes into contact with the seat 400 to block the flow of fluid through the seat 400.

The flow path 500 is formed between the seat 400 and the valve body 200. A fluid flows through the flow path 500. The flow path 500 may be formed inside the valve body 200 and serve to guide the flow of fluid such that the fluid introduced through the inlet 110 is flowable toward the passage hole 410 of the seat 400.

The elastic part 600 is interposed between the seat 400 and the plunger 300 to elastically support the plunger 300. One side of the elastic part 600 is seated on the seat 400 and the other side of the elastic part 600 is seated on the plunger 300 to provide an elastic force to the plunger 300. The elastic part 600 may be an elastically deformable coil spring.

When the armature 800 is not operated due to the lack of magnetic force thereon, the passage hole 410 of the seat 400 is always open as a normally open type to allow free movement of the fluid. That is, the fluid freely flows toward the inlet 110 and the outlet 120.

The sealing part 700 is pressed into the pump housing 100 and the seat 400, and the valve body 200 is seated on the sealing part 700. The sealing part 700 forms a passage through which a fluid flows. The sealing part 700 may be made of a metal material and manufactured by forging or pressing.

The sealing part 700 may block the pressure of fluid in both directions of the inlet 110 and the outlet 120 when the plunger 300 is operated, and may prevent the leakage of the fluid. The sealing part 700 may include a first sealing member 710 and a second sealing member 720.

The first sealing member 710 may be in the form of a hollow, and have a first communication passage 711 provided therein to fluidly communicate with the outlet 120. The outer surface (upper surface in FIG. 1) of the first sealing member 710 may be provided with a first port 712 communicating with the passage hole 410 of the seat 400.

The first sealing member 710 may be pressed into the seat 400. In other words, the upper portion of the first sealing member 710 may be pressed upward into the seat 400 so that the position of the first sealing member 710 is fixed by the seat 400.

The second sealing member 720 may be provided on the outside of the first sealing member 710 and may be formed to surround the circumference of the first sealing member 710. The second sealing member 720 may be formed integrally with the first sealing member 710 and may be spaced apart from the first sealing member 710.

The second sealing member 720 may be in the form of a hollow, and have a second communication passage 720*a* provided therein to fluidly communicate with the flow path 500.

The second sealing member 720 may be pressed into the pump housing 100 so that the position of the second sealing member 720 is fixed by the pump housing 100. In Addition, the valve body 200 may be seated on the upper edge of the second sealing member 720 so that the second sealing member 720 is restrained by the valve body 200.

The second sealing member 720 may include a first extension 721 and a second extension 722. The first extension 721 may be bent from the end of the first sealing member 710 and extend in the radial direction of the first sealing member 710.

The second extension 722 may be bent from the end of the first extension 721 and extend in the longitudinal direction of the first sealing member 710. The second extension 722 may be provided with a second port 723 communicating with the inlet 110. A fluid may flow to the inlet 110 and the second communication passage 720*a* of the second sealing member 720 through the second port 723.

The second port 723 may consist of a plurality of second ports spaced in the circumferential direction of the second extension 722. The second ports 723 may each include a through-hole 723*a* formed through the outer surface of the second extension 722. An upper end of the first sealing member 710 protrudes further toward the plunger 300 than an upper end of the second sealing member 720.

The vehicular braking apparatus according to the first embodiment of the present disclosure may further include a first filter 1000 and a second filter 1100.

The first filter 1000 may be interposed between the inlet 110 and the second sealing member 720 so as to serve to filter a fluid. The first filter 1000 may filter foreign substances contained in the fluid that flows to the second port 723 of the second sealing member 720 through the inlet 110 or flows to the inlet 110 through the second port 723.

The second filter 1100 may be interposed between the outlet 120 and the sealing part 700 so as to serve to filter a fluid. The second filter 1100 may filter foreign substances contained in the fluid that flows to the outlet 120 through the first communication passage 711 of the first scaling member 710 or flows to the first communication passage 711 through the outlet 120.

Figure 3:
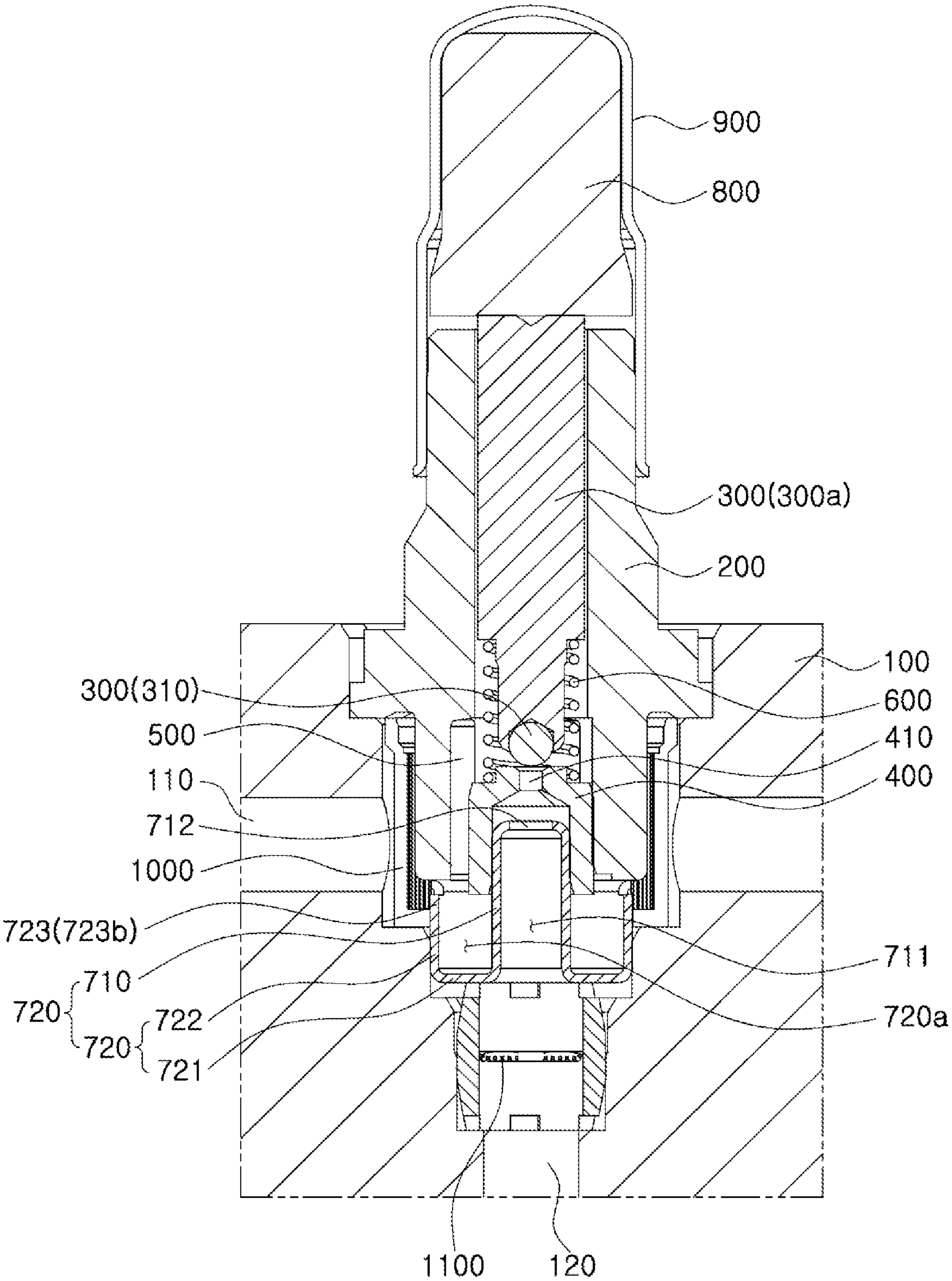
FIG. 3 is a cross-sectional view illustrating a vehicular braking apparatus according to a second embodiment of the present disclosure.
Figure 4:
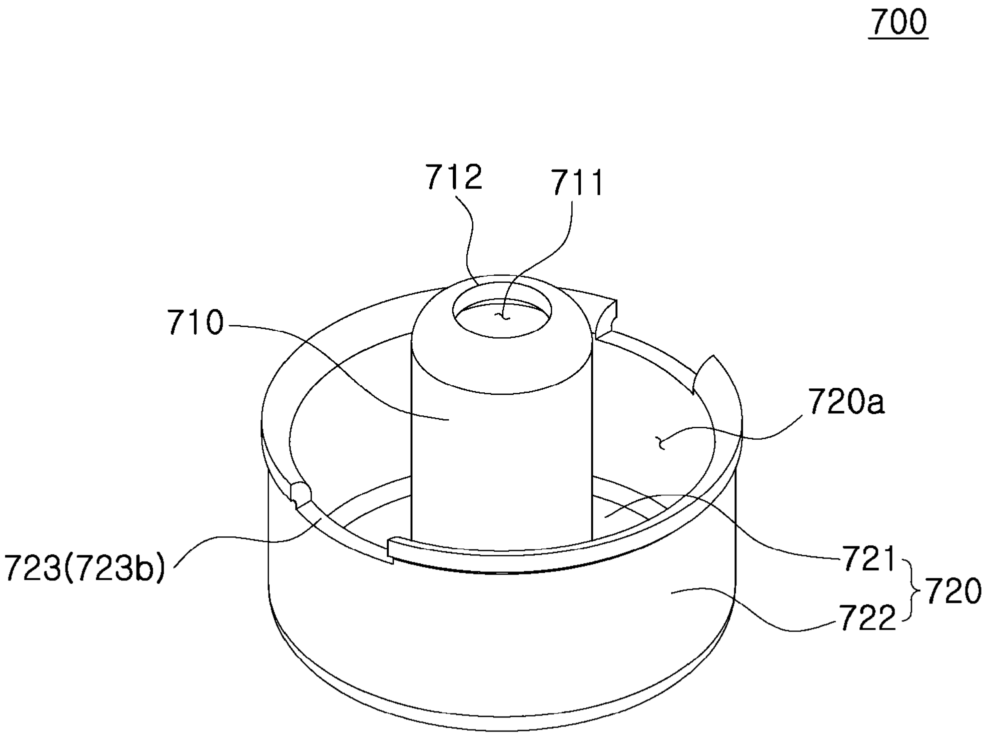
FIG. 4 is a perspective view illustrating a sealing part of the vehicular braking apparatus according to the second embodiment of the present disclosure.

FIG. 3 is a cross-sectional view illustrating a vehicular braking apparatus according to a second embodiment of the present disclosure. FIG. 4 is a perspective view illustrating a scaling part of the vehicular braking apparatus according to the second embodiment of the present disclosure.

Referring to FIGS. 3 and 4, the vehicular braking apparatus according to the second embodiment of the present disclosure is substantially similar to that according to the first embodiment, with the sole exception of a shape of a second port 723 provided in a second extension 722. Therefore, the same reference numerals will be assigned to the same components and a description thereof will be omitted.

The second port 723 may include a stepped portion 723*b* recessed from the edge of the second extension 722. The second port 723 may be formed on the upper edge of the second extension 722, on which the valve body 200 is seated and which comes into contact with the lower end of the valve body 200. For example, the second port 723 may be chamfered by cutting and machining.

The second port 723 may be stepped on the edge of the second extension 722 to form a gap communicating with the inlet 110 between the second extension 722 and the valve body 200. A fluid may flow to the inlet 110 and the second communication passage 720*a* of the second scaling member 720 through the second port 723. The second port 723 may consist of a plurality of second ports spaced in the circumferential direction of the second extension 722.

The vehicular braking apparatus according to the embodiments of the present disclosure provides the sealing part 700 that is pressed into the pump housing 100 and the seat 400 and is restrained by the valve body 200 to fix the position of the sealing part 700, which can block the pressure of fluid acting in both directions of the inlet 110 and the outlet 120 during the operation of the plunger 300 and can prevent the leakage of the fluid.

The vehicular braking apparatus according to the embodiments of the present disclosure can reduce material costs by eliminating several machining methods through simplification of the shape of the scaling part 700.

The embodiment of the present disclosure is described only in an exemplary manner with reference to the drawings. It would be understandable to a person of ordinary skill in the art to which the present disclosure pertains that various modifications may possibly be made to the embodiment and that various equivalents thereof may possibly be implemented. Therefore, the legitimate technical scope of the present disclosure should be defined by the following claims.

What is claimed is:

1. A vehicular braking apparatus comprising:

a pump housing having an inlet and an outlet through which a fluid flows;

a valve body inserted in and fixed to the pump housing;

a plunger positioned in the valve body and configured to be moved by an armature;

a seat installed inside the valve body and having a passage hole through which the fluid passes, the seat being configured to block a flow of the fluid when positioned in contact with the plunger;

a flow path formed between the seat and the valve body through which the fluid flows;

an elastic part interposed between the seat and the plunger and configured to elastically support the plunger; and a sealing part pressed into the pump housing and the seat and including a passage through which the fluid flows, the valve body being seated on an upper portion of the sealing part so as to restrain the sealing part, wherein:

the sealing part comprises:

a first sealing member including a first communication passage positioned in fluid communication with the outlet and a first port that extends through an outer surface of the first sealing member and positioned in fluid communication with the passage hole; and a second sealing member provided on an outside of the first sealing member and surrounding the first sealing member, the second sealing member including a second communication passage positioned in fluid communication with the flow path;

the first sealing member is pressed into the seat;

the second sealing member is pressed into the pump housing, the valve body being seated on the second sealing member so as to restrain the second sealing member of the sealing part; and an upper end of the first sealing member extends farther toward the plunger than an upper end of the second sealing member;

the second sealing member comprises:

a first extension that extends from a lower end of the first sealing member in a radial direction of the first sealing member; and a second extension that extends from an outer end of the first extension and in a longitudinal direction of the first sealing member, the second extension including at least one second port in fluid communication with the inlet; and the at least one second port comprises a stepped portion recessed from an upper edge of the second extension, the stepped portion forming a gap between the second extension and the valve body in fluid communication with the inlet.

2. The vehicular braking apparatus according to claim 1, wherein:

the at least one second port includes a plurality of second ports spaced apart from each other around a circumference of the second extension.

3. The vehicular braking apparatus according to claim 1, further comprising a first filter interposed between the inlet and the second sealing member to filter the fluid.

4. The vehicular braking apparatus according to claim 3, further comprising a second filter interposed between the outlet and the sealing part to filter the fluid.

* * * * *